BANDWIDTH REDUCTION SYSTEM

Filed Oct. 7, 1968

2 Sheets-Sheet 1

INVENTOR
JOHN W. SMITH
BY Edward T. Connors
ATTORNEY

Feb. 10, 1970 J. W. SMITH 3,495,032

BANDWIDTH REDUCTION SYSTEM

Filed Oct. 7, 1968 2 Sheets-Sheet 2

INVENTOR
JOHN W. SMITH
BY Edward Connors
ATTORNEY

United States Patent Office 3,495,032
Patented Feb. 10, 1970

3,495,032
BANDWIDTH REDUCTION SYSTEM
John W. Smith, Whitestone, N.Y., assignor to Graphic Transmission Systems Inc., Hanover, N.J., a corporation of Delaware
Filed Oct. 7, 1968, Ser. No. 765,579
Int. Cl. H04n *7/00;* H04b *1/66;* H04l *15/00*
U.S. Cl. 178—6 14 Claims

ABSTRACT OF THE DISCLOSURE

The block diagram shows a bandwidth reduction system which does not employ clock timing to produce a binary signal, the pulses of the binary signal being provided by changes in density of the copy set out in an analogue signal.

The present invention relates to an improved bandwidth reduction system for transmission of the information from an analogue signal over a communications channel of limited bandwidth.

The analogue signal may be of any type such as an unmodified facsimile signal. Without bandwidth reduction about six minutes are required to transmit a facsimile signal for a standard sized letter page over a conventional telephone circuit. When bandwidth reduction is provided the transmission time may be reduced to three minutes. Heretofore, bandwidth reduction systems have been provided wherein analogue signals have been converted to binary signals which have then been converted into multi level signals. These signals have been used to modulate a carrier for transmission over telephone circuits.

Many of the prior bandwidth reduction systems have used clock timing means to produce binary signals with equally spaced pulses. Such systems have the disadvantage of a loss of resolution and/or transmission speed for a given bandwidth amounting to as much as thirty percent. A detailed discussion of the problems encountered with bandwidth reduction of facsimile signals is found in Signal magazine, December 1966, pp. 19 et seq. by R. E. Wernikoff, titled Digital Facsimile, and in an unpublished article by the applicant herein dated Sept. 28, 1966 and titled "Discussion of Digitized Facsimile." The difficulty is caused by the manner of sampling the analogue signal so that much of the information is lost.

The present invention aims to provide an improved bandwidth reduction system which overcomes, to a large extent, the difficulties of prior systems by providing a bandwidth reduction system which does not employ clock timing to produce equally spaced pulses in the binary signal.

In accordance with the invention this is accomplished by producing binary pulses from analogue pulses of the facsimile signal. Changes in density of the copy produce changes in signal levels of the pulses of the analogue signal, the changes in signal level being used to produce the binary pulses.

The system in accordance with the invention is advantageous in that a bandwidth reduction system using binary signals may have no loss in resolution in the event that the pulses in the analogue signal have adequate spacing.

Another advantage of the system in accordance with the invention is its simplicity as compared with clock timed systems.

A further advantage of the system in accordance with the invention is that thin isolated black lines of a copy will always be reproduced whereas in clock-controlled digital systems such lines may be missed entirely. Also, in the clock-controlled digital systems, isolated black lines which are reproduced will often be displaced from the place where they should appear.

A still further advantage of the system is that where thin black lines in the copy are too closely spaced for reproduction by the system, they are not blurred together as in previous systems, but instead isolated lines are dropped out to permit copy reproduction with negligible degradation.

Other objects and advantages of the invention will be apparent from the following description and from the accompanying drawings which show, by way of example, an embodiment of the invention.

Figure 1:
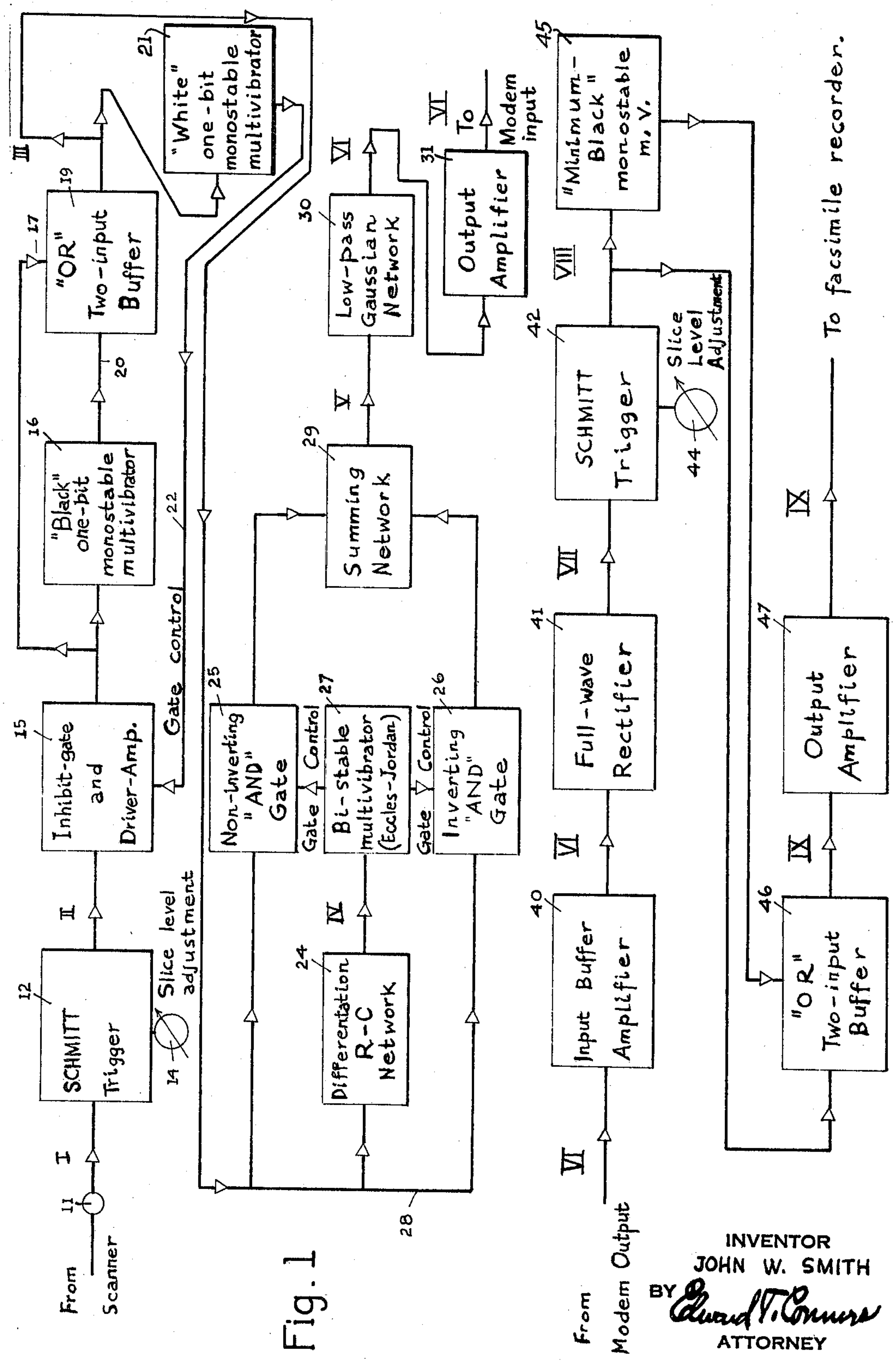
FIGURE 1 is a block diagram of a bandwidth reduction system in accordance with the invention.
Figure 2:
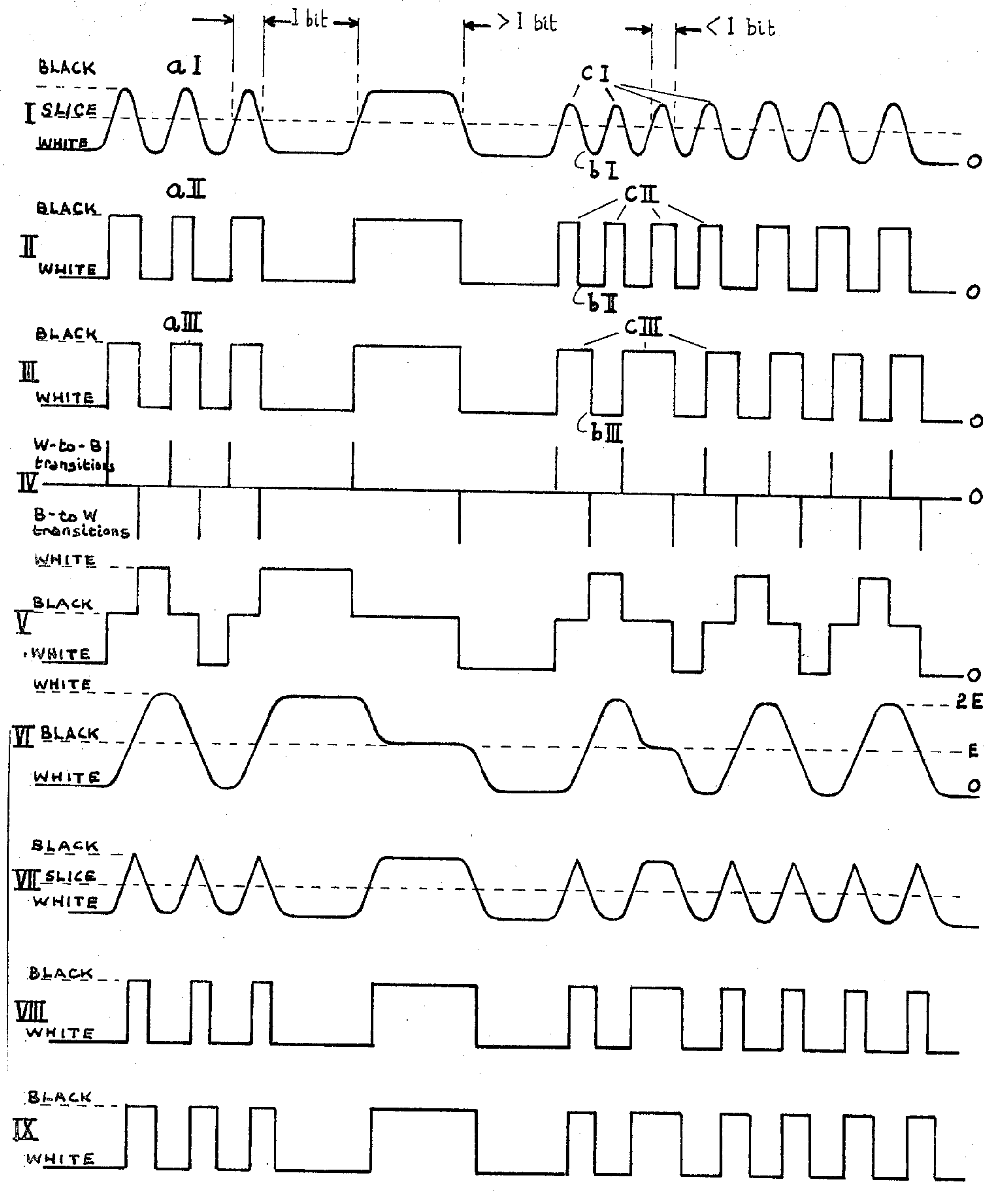
FIGURE 2 shows waveforms useful in understanding the operation of the system shown in FIGURE 1.

Referring to FIGURE 1 there is shown an input terminal 11 to which may be supplied an analogue signal such as from a facsimile scanner photoelectric sensor either directly or through a simple amplifier. These signals are commonly known as base-band, video or picture frequency signals and may contain all frequencies from zero up to the element frequency of the system which is set by the optical resolution and scanning spot velocity. A typical facsimile signal is shown in waveform I of FIGURE 2 and illustrates the characteristic trapezoidal shaped pulses produced by a scanning aperture.

Any finite aperture may be considered as a form of low-pass filter with the characteristic shape of the sin $x/x$ function, so a perfectly sharp transition from black to white or vice versa in the scanned copy, which would be represented by infinite frequency, is distorted by the aperture. A detailed discussion of this subject is found in "A Theory of Scanning" by Mertz and Gray, Bell System Technical Journal for July 1934.

The aperture-distorted facsimile signals of the waveform I are applied to the input of the Schmitt trigger 12 of FIGURE 1, and which may be called means forming a binary signal from the analogue signal. The Schmitt trigger is a well known circuit in the art which has effectively zero output for all values of input below some predetermined level and has a uniform maximum output for all input signals above the predetermined level. In other words, the Schmitt trigger takes a varying input signal with a relatively slow rate-of-change and delivers an output with a very fast rate of change between two fixed levels. A detailed description and design information for the transistor Schmitt trigger is found in "Elements of Transistor Pulse Circuits," T. D. Towers, D. Van Nostrand Co., 1965, page 95 et seq. There are also various other circuits known as voltage comparators, level sensors, etc. which perform the same type of function as the Schmitt trigger, but it is the best known and most widely used device capable of working down to zero frequency.

In the waveform I the approximate center dotted line designated "slice" is the Schmitt trigger transition level. The slice or decision level is usually set about halfway between the white and black levels which represent white and black in the original scanned copy. The slice level may be adjustable over some range by manipulation of slice level control 14 to permit optimum decision level making.

Waveform II is the output from the Schmitt trigger 12 and may be termed the first binary signal. Note that the abrupt change in this signal from "white" or minimum level to "black" or maximum level, and vice versa, occurs where the input signal amplitude and the slice level intersect. The output of the Schmitt trigger 12 is minimum or white level whenever the input signal is below the slice level and is maximum or black level whenever the input is above the slice level.

The output from the Schmitt trigger 12 as shown by the first binary waveform II is applied to an inhibit-gate and driver-amplifier 15. The function of this circuit other than as an amplifier and level changer may be ignored for the moment.

An important characteristic of this system is that no pulse, black or white (absence of a black pulse is considered to be a white pulse), of less than some predetermined time duration is transmitted. This minimum allowable pulse time is commonly called the bit time of a system, or simply a bit. The waveform I shows bit time and pulses shorter and longer than bit time.

The significance of the minimum permissible pulse duration is that the maximum possible fundamental generated frequency of the system is fixed. Consider a succession of minimum duration pulses, alternately black and white. This represents the highest possible fundamental frequency that the system can produce. Since this is a completely abrupt upper limit to the fundamental frequency of the signal (within the accuracy of pulse duration timing circuits which can be quite precise), the system has the nature of a low pass filter of zero attenuation to the cut-off point, an infinite rate of cut-off and infinite attenuation in the stop-band. Obviously, this statement applies only to the fundamental frequency since the square-wave signals theoretically have harmonics extending to infinity. However, modern data transmission techniques require only that the fundamental frequency of a binary (two-level) signal be received, so the highest frequency that must be transmitted is uniquely fixed and known. In practice, the system is usually adjusted to utilize to the fullest possible extent the known bandwidth of an available transmission link.

The output of the inhibit-gate and driver-amplifier 15 may for the moment be considered an amplifier version of the Schmitt trigger 12 output shown by waveform II. The output signal of the driver-amplifier 15 is applied simultaneously to a "Black" one-bit monostable multivibrator 16 and to one input 17 of an "OR" two-input buffer 19. The monostable multivibrator 16 often called a one-shot, has a timed output pulse whose duration is preset at one bit time. So the output of the one-shot multivibrator 16 is a black pulse one bit long, regardless of the duration of the black input pulse which triggered the circuit. This well known circuit is described in detail in "Basic Theory and Application of Transistors," Department of the Army Technical Manual TM 11–690, March 1959, page 193 et seq.

The one-bit black output pulse from the monostable multivibrator 16 is applied to a second input 20 of the "OR" buffer circuit 19. Since the amplified output of the Schmitt trigger 12 is applied to the first buffer input 17, the output from the buffer 19 following any black signal from the Schmitt trigger 12 is a one-bit or longer black signal. Note pulse *a*I of waveform I which results in a shorter than bit pulse *a*II of waveform II which is "stretched" to bit length pulse *a*III of waveform III.

It is not quite so obvious how the one-bit duration minimum white pulse is generated. Output signal from the "OR" buffer 19 is applied to the input of a second one-bit monostable multivibrator 21 designated "White." This circuit sets for one bit-time upon each input signal transition from black-to-white. This is just the opposite of the action of the "Black" multivibrator 16 which sets on a white-to-black transition.

While the white multivibrator 21 is set, it feeds back a signal over gate control circuit 22 to the inhibit-gate and driver-amplifier circuit 15. Since the white multivibrator 21 is set by a black-to-white transition, it is obvious that a white or zero level signal exists in the inhibit-gate driver-amplifier 15 at that instant. The action of the fed-back gate control signal is to lock or hold the inhibit-gate 15 in this white or zero level condition for one bit length regardless of the input signal. In other words, a minimum one-bit length white pulse is generated by inhibiting or blocking any black signal which may start during the one-bit time duration of the white monostable multivibrator 21. At the end of the one-bit white signal the inhibit-gate is released so the driver-amplifier output reverts to an amplified version of the Schmitt trigger output which may be either white or black at that instant. Note white pulse *b*I of the waveform I. This is converted to white pulse *b*II of the waveform II, which obviously is less than bit duration. This is stretched to the bit length white pulse *b*III of waveform III.

The waveform III is a second binary or quasi-digital binary signal which appears at the output of the "OR" buffer circuit 19 of FIGURE 1. The term "quasi-digital" is used herein in describing signals in which the binary pulses are not clock timed but are randomly timed with the rise and fall times of the pulses of the analogue signal. Further, the term describes the signal in which the pulses are binary in nature, some of which are at least of bit length, and others are longer than bit length.

The second binary or quasi-digital signal results from both direct action on the signal and feedback from the white one-bit monostable multivibrator 21. No pulse in the second binary signal, black or white, is shorter than one-bit, and the highest fundamental frequency in the second binary signal is that frequency which has a one-cycle time duration equal to two bit times. Therefore, the highest fundamental frequency that can appear in the output signal is the reciprocal of the time interval equal to two bits time.

It is of interest to note the burst of pulses *c*I and *c*II of waveforms I and II. Four short pulses occur in a time interval which can accommodate only three bit-length pulses. Obviously, one of the pulses must be sacrificed. Comparison of waveforms II and III show that this has been done in what is believed to be an optimum manner. Note that the first pulse in a sequence after any pulse, black or white, of greater duration than two bits time is always triggered by the intersection of the input signal and the slice level, waveform I. This means that, whenever within the constraints of the system it is possible, the transmitted pulse is directly related in time to the analogue facsimile signal, and not to some purely arbitrary clock signal.

When the input pulse rate becomes too fast for the available bandwidth special action occurs, the first pulse in a sequence of rapidly recurring input pulses starts the first pulse in the quasi-digital sequence of output pulses. The minimum permissible pulse length in the quasi-digital signal sets the fastest rate at which pulses can recur in this signal. Therefore, the first pulse in the quasi-digital sequence is directly timed by the first pulse in the sequence of rapidly recurring input pulses, but subsequent pulses in the quasi-digital sequence of pulses occur at times determined both by the timing of the input signals and the time constants of the black and white monostable multivibrators. Hence, the first pulse in the quasi-digital pulse sequence is directly timed by the input pulse while subsequent quasi-digital pulses in a sequence are correlated to the initial input pulse through the intervening multivibrator timed pulses. However, as soon as a pause occurs in the input pulse sequence of sufficient duration, direct timing of the quasi-digital pulses by the input pulses is resumed. The minimum pause which will permit resumption of direct output pulse timing by the input pulses is of one bit time duration, and the maximum pause which is ever required for resumption of direct timing is two bit times.

With practical graphic material, it has been found that most second binary or quasi-digital signal pulses start directly from the input analogue signal pulses, so the second binary or quasi-digital signal waveform III retains many of the advantages of analogue signals. At the same time, because of the binary nature of the signals, the fixed minimum pulse duration thereof, and the accurately known maximum fundamental frequency brings most of the advantages of digital transmission into the system.

The second binary or quasi-digital signals of the waveform III are applied to a differentiation R-C network 24 and to two gates 25 and 26. Gate 26 inverts the signal polarity. The output of the differentiation network 24 is shown in triggering pulse waveform IV. A short pulse is generated at each transition of the second binary waveform III. The short pulse polarity is determined by the transition polarity in waveform III. These short triggering pulses of the waveform IV are applied to the input of a bi-stable multivibrator 27, often called an Eccles-Jordan flip-flop, which changes state each time a short input pulse of a predetermined polarity is received. This is a well known and very useful circuit described in detail in the literature in many places, as for example in the "General Electric Transistor Manual," seventh edition, page 186 et seq. It is to be noted that the bi-stable multivibrator 27 responds only to input pulses of a certain polarity. In the present case, it is of no consequence whether the circuit "flips" on the positive-going (white-to-black) or negative-going (black-to-white) pulses so long as it is consistent. The waveforms III and V as shown require that the flip occur on the negative pulses of waveform IV, but there is no difference at all in actuality. It may be noted that the bi-stable multivibrator 27 effectively divides the number of input pulses by two and its circuit is widely employed for this purpose.

The Eccles-Jordan bi-stable multivibrator 27 alternately opens and closes the associated "AND" gates 25 and 26 which may be termed parallel circuits supplied through input line 28. The input to these parallel circuits is the second binary signal shown in the waveform III. Since one of the gates inverts the white signal pulses while the other does not, and a common black reference level is maintained, a three-level signal which is the algebraic sum of the output signals of the gates appears at the output of summing network 29. The polarity inverting means of inverting "AND" gate 26 may be of any conventional construction, a satisfactory construction being a common emitter transistor amplifier with its input signal applied to the base of the transistor and an inverted output signal taken from the collector of the transistor.

The summing network 29 may be constructed simply of a pair of resistors connected in series across the outputs of the gates 25 and 26 with the output of the summing network taken from the junction of the two resistors.

Waveform V illustrates the three-level signal which results from the algebraic addition of the alternately inverted and non-inverted white signal pulses of the waveform III.

It will be noted that a very simple rule controls the encoding of the second binary quasi-digital waveform III signal to the three-level signal of the waveform V. Every black pulse stays at the common median level while the white pulses become alternately positive and negative with respect to the median level. Comparison of the waveform III with the waveform V discloses this simple relationship.

The waveform V is a three-level signal of special characteristics. Fundamental information theory states that the number of bits of information D that can be transmitted in a given channel of bandwidth $w$ is $2w(\log_2 n)$ where D is in bits per second, $w$ is cycles-per-second (Hertz) and $n$ is the number of signal levels. If we solve the formula $D=2w(\log_2 n)$ for $w=1$ and $n=2$, we arrive at the Nyquist limit of two information bits per cycle of channel bandwidth. For details, see "Certain Topics in Telegraph Transmission Theory," H. Nyquist, Transactions A.I.E.E., February 1928. If $n$ becomes 3, D becomes approximately 3.18 bits per cycle of bandwidth. When $n$ is 4, D becomes 4 which is twice the Nyquist limit for a binary two-level signal.

The fundamental theory briefly presented above indicates that a three-level signal would improve the transmission rate over a simple two-level binary signal only by a factor of about 1.59 to 1. However, the theory assumes that transition from one extreme level to the other extreme level can occur in one bit time interval. A study of the waveform V will show that the transition from one extreme level to the other extreme level never occurs in one bit time interval with this quasi-digital three-level signal. Instead, at the lower limit two bit time intervals are available for the amplitude change from one extreme to the other extreme. The significance of this is that the slope of the rate-of-change of the signal amplitude is reduced by a factor of two. This slope reduction for a given information rate results in a gain of 2/1 over the maximum rate for simple binary transmission. Note that this special constraint which limits the rate-of-change of the signal amplitude must be applied to achieve a 2/1 gain by three-level transmission over simple binary transmission. A study of the waveform V shows that the slope limiting constraint is automatically satisfied since a change from one limit to the other limit is never made in a time interval of less than two bits.

Signals of the waveform V from the summing network 29 are applied to a low-pass filter 30 designated as a low-pass Gaussian network. Actually a slightly modified Gaussian filter is used which tends to produce a so-called raised-cosine pulse from the square bit length pulses. The raised-cosine pulse is shown and discussed in some detail in "Data Transmission," Bennett and Davey, McGraw-Hill, 1965, page 98. The raised-cosine pulse has slight tails due to a small amount of ringing in the circuit. The Gaussian networks, as described in "Simplified Modern Filter Design" by P. R. Geffe, Hayden Book Co., 1963, for example, theoretically exhibit no ringing so output pulses from square-wave input signals exhibit no tails. However, the raised-cosine shape has been shown to make optimum use of a transmission channel of limited bandwidth, so the Gaussian network is modified slightly to produce an output essentially of the raised-cosine shape when a square wave input is applied.

The waveform VI shows the three-level signal shape after passage through the low-pass network 30. Comparison of this waveform with the waveform I shows that the frequency of the signal has been divided by two by the previously described operations. This means that the signal of the waveform VI, which contains essentially all of the information in the signal of the waveform I can be transmitted through a channel of one-half the bandwidth that would be required for the waveform I signal.

The signal of the waveform VI is amplified by output amplifier 31 for application to a modem transmission system. Modem is a commonly used term to designate a modulator and demodulator system to permit signal transmission over available transmission channels. A widely used modem for the transmission of facsimile signals over the dial-up telephone system is the Bell System 602 "Dataphone." This modem will handle baseband signals from zero frequency to approximately 1000 hertz. The maximum facsimile transmission rate when using this modem for analogue or binary signals is at the rate of one 8½ by 11 inch page of representative graphic material in about 6 minutes. However, the use of the three-level signals of the described character permits the transmission of an 8½ by 11 inch page of facsimile copy through the dial-up telephone system using the 602 Dataphone modem in about 3 minutes.

This bandwidth reduction system is set up for a bit time of 250 microseconds for such application. A black bit-length pulse followed by a white bit-length pulse gives a basic period of 500 microseconds or a top baseband frequency of 2000 hertz. The three-level special encoding divides the baseband frequency by two so the highest signal frequency becomes 1000 hertz. This is right at the upper limit of the 602 Dataphone modem so the available channel is completely utilized.

The signals of the waveform VI are received from the channel modem output and are applied to an input buffer amplifier 40. This circuit merely repeats the signals at low impedance so the modem output is not loaded by the following full-wave rectifier stage 41.

The full-wave rectifier 41 converts the input signal of the waveform VI to the signal of waveform VII. This is a typical full-wave rectifier action which doubles the frequency of the input signal. Note that this is equivalent to folding the upper half of waveform VI down to the bottom half about the black axis.

The construction of a full wave rectifier is known in the art as it is a common means for converting a three level signal back to a signal of baseband frequency. A construction which may be used is a transistor amplifier with equal resistance loads in the emitter and collector circuits. When an input signal is applied to the base of the transistor amplifier a non-inverted replica of this signal appears at the emitter of the transistor and an inverted replica of the signal appears at the collector. These output signals are in phase opposition and may be applied through rectifying diodes to a common load to give an output which is full wave rectified.

The original quasi-digital baseband facsimile signal frequency is divided in two by the encoder system, and the full wave rectifier in the decoder restores the original frequency by frequency doubling action.

The signal of the waveform VII is applied to a Schmitt trigger 42 with a slice level adjustment 44 similar to the Schmitt trigger 12 used in the encoder. The trigger stage 42, with the slice level 44 set as indicated on the waveform VII, produces the binary signal of waveform VIII.

It will be noted that some of the black pulses of the waveform VIII are of rather short time duration. Most facsimile recorders will not print a good black if the input pulse is too short. Therefore the minimum-black monostable multivibrator 45 and the "OR" two-input buffer 46 are included to assure that any received black pulse, no matter how short, will be stretched to a time duration adequate to assure a good black mark on the recorded page. The action of the minimum-black multivibrator 45 and of the "OR" circuits 46 is identical with that of the black one-bit multivibrator 16 and the "OR" circuit 17, and need not be described again. Usually the minimum-black multivibrator 45 is timed to produce an output pulse about one bit long.

Waveform IX shows the output signal when the minimum-black multivibrator 45 is set for a one-bit minimum duration signal.

A low impedance output amplifier 47 is used to couple the signal of the waveform IX to a facsimile recorder system. The exact nature of the amplifier 47 depends upon the particular facsimile recorder with which it is being used.

Thus it may be seen that a quasi-digital bandwidth reduction system has been provided in accordance with the invention which obtains the digital signal advantages of binary transmission, uniform pulse length, adaptability to multi-level bandwidth reduction techniques, and at the same time retains some of the advantages of analogue transmission. In particular, the establishment of correlation between the time of occurrence of the quasi-digital pulses avoids the penalty of bandwidth or resolution loss exacted by the digital system due to the arbitrary time relationships of the sampling clock signals and the analogue facsimile signals. Also the implementation of the quasi-digital system is less complicated and expensive than digital signal processing.

While the invention has been described and illustrated with reference to a specific embodiment thereof, it will be understood that other embodiments may be resorted to without departing from the invention, Therefore, the form of the invention set out above should be considered as illustrative and not as limiting the scope of the following claims.

I claim:

1. A bandwidth reduction system for converting an analogue signal to a binary signal of baseband frequency thereafter transformed to a three level signal of one half said baseband frequency for transmisison through a transmission channel to a receiver and for converting said three level signal back to a binary signal of said baseband frequency, said system comprising means responsive to changes in signal level of the analogue signal for producing trigger pulses for said binary signal, pulse lengthening means making the minimum pulses of said binary signal one bit in length, pulse after spacing means making the minimum space between pulses one bit in length, said pulse lengthening and spacing means together providing a pulse and a space of two bit times so that the maximum fundamental generated frequency is fixed, and pulse blocking means so that said binary signal does not include a corresponding pulse in time sequence for a change in signal level of the analogue signal occurring during the one bit time and after spacing time of the binary pulse triggered by a prior change in the analogue signal, whereby isolated lines are reproduced but lines so closely spaced as to require bandwidth capability beyond the maximum fundamental generated frequency are not transmitted.

2. A bandwidth reduction system according to claim 1 in which said means responsive to changes in signal level of the analogue signal for producing trigger pulses for said binary signal includes threshold means, pulse producing means, and differentiating means for the pulse produced by said last mentioned means.

3. A bandwidth reduction system according to claim 1 in which said differentiating means is a short time constant resistor-capacitor circuit.

4. A bandwidth reduction system according to claim 1 in which said polarity inverting means is a collector loaded common emitter transistor amplifier.

5. A bandwidth reduction system according to claim 1 in which said pulse blocking means is a gate.

6. A bandwidth reduction system for converting an analogue facsimile signal of baseband frequency to a three level signal of one half said baseband frequency for transmission through a communication channel to a receiver and for converting said three level signal back to a binary signal of said baseband frequency, said system comprising means forming a first binary signal from an analogue signal, means forming a second binary signal from said first binary signal, pulse lengthening means for the pulses of said second binary signal so that the minimum pulse duration thereof is one bit, pulse spacing means for the pulses of said second binary signal making the minimum spaces between the pulses of predetermined length, whereby said second binary signal does not include a corresponding pulse in time sequence which appears in said first binary signal at the same time as a lengthened pulse or space of said second binary signal, said second binary signal having a next pulse in time sequence corresponding to that of said first binary signal so as not to affect the accuracy of timing of the following train of pulses, differentiating means for said second binary signal producing triggering pulses, a parallel circuit, common input means for the parallel circuit supplying said binary signal thereto, polarity inverting means in one branch of said parallel circuit, common output means, double throw switching means alternately connecting branches of said parallel circuit to said common output, actuating means for said switching means responsive to said triggering pulses, whereby a three level signal is produced in said common output for transmission to a receiver, and means for converting said three level signal back to said baseband frequency.

7. A bandwidth reduction system according to claim 6 in which said means forming a first binary signal from said analogue signal is threshold means and peak limiting means.

8. A bandwidth reduction system according to claim 6 in which said differentiating means is a short time constant resistor-capacitor circuit.

9. A bandwidth reduction system according to claim 6 in which said polarity inverting means is a collector loaded common emitter transistor amplifier.

10. A bandwidth reduction system according to claim 6 in which said double throw switching means alternately connecting branches of said parallel circuit to said common output is a bistable multivibrator and a pair of coincidence gates, one gate in each branch of the parallel circuit.

11. A bandwidth reduction system according to claim 10 in which said actuating means for said switching means is triggering means for said bistable multivibrator.

12. A bandwidth reduction system according to claim 6 in which said means for converting said three level signal back to baseband frequency is a full wave rectifying means capable of functioning down to zero frequency.

13. A bandwidth reduction system according to claim 6 in which said pulse lengthening means includes a monostable multivibrator having a predetermined time constant.

14. A bandwidth reduction system according to claim 6 in which said pulse spacing means includes a monostable multivibrator having a predetermined time constant, and a signal inhibiting gate.

References Cited

UNITED STATES PATENTS 3,162,724 12/1964 Ringelhaan ---------- 178—68

ROBERT L. GRIFFIN, Primary Examiner

R. K. ECKERT, Jr., Assistant Examiner

U.S. Cl. X.R.

178—68; 179—15.55; 325—35; 328—58